(12) United States Patent
Edwards et al.

(10) Patent No.: US 11,680,804 B2
(45) Date of Patent: Jun. 20, 2023

(54) SYSTEM AND METHOD FOR VERIFYING ROADS

(71) Applicant: Toyota Motor North America, Inc., Plano, TX (US)

(72) Inventors: Michael C. Edwards, McKinney, TX (US); Jay Bartholomew, McKinney, TX (US); John Kenney, Santa Clara, CA (US); Jason Schell, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 304 days.

(21) Appl. No.: 16/700,793

(22) Filed: Dec. 2, 2019

(65) Prior Publication Data

US 2021/0164790 A1 Jun. 3, 2021

(51) Int. Cl.
*G01C 21/34* (2006.01)

(52) U.S. Cl.
CPC ..... *G01C 21/3415* (2013.01); *G01C 21/3446* (2013.01); *G01C 21/3461* (2013.01); *G01C 21/3492* (2013.01)

(58) Field of Classification Search
CPC ............ G01C 21/3415; G01C 21/3446; G01C 21/3815; G01C 21/00; G01C 21/005; G01C 21/04; G01C 21/14; G01C 21/16; G01C 21/165; G01C 21/1652; G01C 21/1656; G01C 21/20; G01C 21/26; G01C 21/28; G01C 21/30; G01C 21/32; G01C 21/34; G01C 21/3407; G01C 21/343; G01C 21/3453; G01C 21/3461; G01C 21/3614; G01C 21/3617; G01C 21/362; G01C 21/3626; G01C 21/3641; G01C 21/3644; G01C 21/3647; G01C 21/3673; G01C 21/3676; G01C 21/38; G01C 21/3804; G01C 21/3807; G01C 21/3811; G01C 21/3822; G01C 21/3833; G01C 21/3841; G01C 21/3852; G01C 21/3856; G01C 21/3859; G01C 21/3885; G01C 21/3896;
(Continued)

(56) References Cited

U.S. PATENT DOCUMENTS 8,010,280 B2 8/2011 Sekine
8,306,733 B2 11/2012 Shikimachi
(Continued)

FOREIGN PATENT DOCUMENTS

WO 2018103848 A1 6/2018

OTHER PUBLICATIONS

Electronics 2018, 7, 276; Jiyoung Jung et al. "Real-Time Road Lane Detection in Urban Areas Using LiDAR Data".

*Primary Examiner* — Adam R Mott
*Assistant Examiner* — Erick T. Detweiler
(74) *Attorney, Agent, or Firm* — Snell & Wilmer LLP

(57) ABSTRACT

Methods and systems for verifying a state of a road. The system includes a sensor of a vehicle configured to detect sensor data associated with the road. The system also includes a memory of the vehicle configured to store map data. The system also includes an electronic control unit (ECU) of the vehicle connected to the sensor and configured to determine road data or maneuvering data associated with the road based on the sensor data, and update the map data with the determined road data or maneuvering data.

20 Claims, 4 Drawing Sheets

(58) Field of Classification Search
CPC ............ G01C 21/3492; G01C 21/3476; G01C 21/3484; G01C 21/3602; G01C 21/3679; G01C 21/3682; G01C 21/3691; G01C 21/3694; G08G 1/00; G08G 1/01; G08G 1/0104; G08G 1/0108; G08G 1/0112; G08G 1/0116; G08G 1/012; G08G 1/0125; G08G 1/0129; G08G 1/0133; G08G 1/0137; G08G 1/0141; G08G 1/0145; G08G 1/048; G08G 1/056; G08G 1/0967; G08G 1/096708; G08G 1/096716; G08G 1/096725; G08G 1/096733; G08G 1/09675; G08G 1/096827; G08G 1/096855; G08G 1/096861; G08G 1/096866; G08G 1/096872; G08G 1/096888; G08G 1/096775; G08G 1/096791; B60W 2556/65; B60W 30/0956; G05D 1/0214; G05D 2201/0213; G05D 1/0088
See application file for complete search history.

(56) References Cited

U.S. PATENT DOCUMENTS

| | | | |
|---|---|---|---|
| 8,694,246 B2 * | 4/2014 | Yamakawa | G01C 21/36 701/428 |
| 9,002,633 B2 | 4/2015 | Igodt | |
| 9,568,325 B2 | 2/2017 | Schunder et al. | |
| 9,939,276 B2 | 4/2018 | Cui et al. | |
| 10,099,697 B2 | 10/2018 | Tatourian et al. | |
| 10,148,709 B2 | 12/2018 | Boldyrev et al. | |
| 10,241,207 B2 | 3/2019 | Rosenzweig et al. | |
| 2013/0325320 A1 * | 12/2013 | Dimitriadis | G01C 21/3664 701/414 |
| 2015/0166072 A1 * | 6/2015 | Powers | G08G 1/015 701/1 |
| 2017/0176206 A1 | 6/2017 | Huth | |
| 2017/0332198 A1 | 11/2017 | Dannenbring et al. | |
| 2018/0066957 A1 * | 3/2018 | Stroila | G01C 21/3694 |
| 2018/0314259 A1 * | 11/2018 | Shami | B60W 30/0953 |
| 2018/0347993 A1 | 12/2018 | Hermiz et al. | |
| 2019/0019409 A1 * | 1/2019 | Farr | G08G 1/09626 |
| 2019/0051153 A1 | 2/2019 | Giurgiu et al. | |
| 2019/0259272 A1 * | 8/2019 | Nakamura | G08G 1/0129 |
| 2019/0376809 A1 * | 12/2019 | Hanniel | G05D 1/021 |
| 2019/0384294 A1 * | 12/2019 | Shashua | G01C 21/32 |
| 2020/0011684 A1 * | 1/2020 | McErlain, II | G01C 21/20 |
| 2020/0208998 A1 * | 7/2020 | Xiang | G01C 21/3461 |
| 2020/0209005 A1 * | 7/2020 | Hou | G01C 21/28 |
| 2020/0209009 A1 * | 7/2020 | Zhang | G06F 3/04815 |
| 2020/0211370 A1 * | 7/2020 | Chen | G05D 1/0088 |
| 2020/0232800 A1 * | 7/2020 | Bai | G06T 5/50 |
| 2020/0276977 A1 * | 9/2020 | Saleh | B60W 40/02 |
| 2020/0385014 A1 * | 12/2020 | Hanniel | B60W 60/001 |
| 2021/0049373 A1 * | 2/2021 | Vladimerou | B60W 40/04 |
| 2021/0080268 A1 * | 3/2021 | Zhang | G06F 16/2379 |
| 2021/0123752 A1 * | 4/2021 | Rolf | G01C 21/3446 |

* cited by examiner

SYSTEM AND METHOD FOR VERIFYING ROADS

BACKGROUND

1. Field

This specification relates to a system and a method for verifying aspects of a road using vehicle sensors.

2. Description of the Related Art

Some drivers are able to drive from a current location to a destination without any assistance, as these routes may be familiar to the drivers. Other drivers may rely on navigation systems and maps stored on vehicles while operating the vehicle, for a route from a current location to a destination. These navigation systems and maps may identify roads to take and maneuvers to make to reach the destination. If the driver follows the route provided by the navigation system, the driver can expect to reach the destination. For example, a navigation system may instruct a driver to drive on Road A for 3.6 miles and then make a left turn onto Road B. However, in some situations, Road B may not be a road that can be traversed by the vehicle. In other situations, performing the left turn from Road A to Road B may be legally and physically possible, but may not realistically be feasible or efficient, for any number of reasons. Thus, there is a need for improving maps used by vehicles.

SUMMARY

What is described is a system for verifying a state of a road. The system consists of a vehicle fitted with a computing component that analyzes vehicle sensor data to determine the condition/state of a roadway. The system includes a sensor of a vehicle configured to detect sensor data associated with the road. The system also includes a memory of the vehicle configured to store map data. The system also includes an electronic control unit (ECU) of the vehicle connected to the sensor and configured to determine road data or maneuvering data associated with the road based on the sensor data, and update the map data with the determined road data or maneuvering data.

Also described is a system for verifying a state of a road. The system includes a sensor of a vehicle configured to detect sensor data associated with the road. The system also includes a transceiver of the vehicle configured to communicate the sensor data to a remote data server. The system also includes a memory of the remote data server configured to store map data. The system also includes a processor of the remote data server configured to determine road data or maneuvering data associated with the road based on the sensor data, and update the map data with the determined road data or maneuvering data. The system also includes a transceiver of the remote data server configured to communicate the updated map data to the vehicle.

Also described is a method for verifying a state of a road. The method includes detecting, by a sensor of a vehicle, sensor data associated with the road. The method also includes storing, by a memory of the vehicle, map data. The method also includes determining road data or maneuvering data associated with the road based on the sensor data. The method also includes updating the map data with the determined road data or maneuvering data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for verifying the state of various roads. The systems and methods herein use sensors on vehicles to detect data associated with roads, and determine the state of the roads. When there is a change to a road state (e.g., previously an open, paved road, but now a temporarily closed road), the map data used by a vehicle navigation system will be updated to reflect the change. In this way, vehicle drivers have updated information regarding roads. The updated information allows for safer and more efficient driving. Some advantages include a more efficient navigation system, fuel or electric charge savings, avoiding travelling down a road and getting stuck or having to turn around, safer driving conditions for the driver, passengers, and vehicle, etc.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle. As used herein, "handle" may be used to describe a vehicle's ability to safely traverse a road segment. As used herein, "road segment" may be used to refer to portions of a road or paths of various lengths, without regard to whether the path or road is paved or otherwise altered to accommodate vehicular travel.

Figure 1:
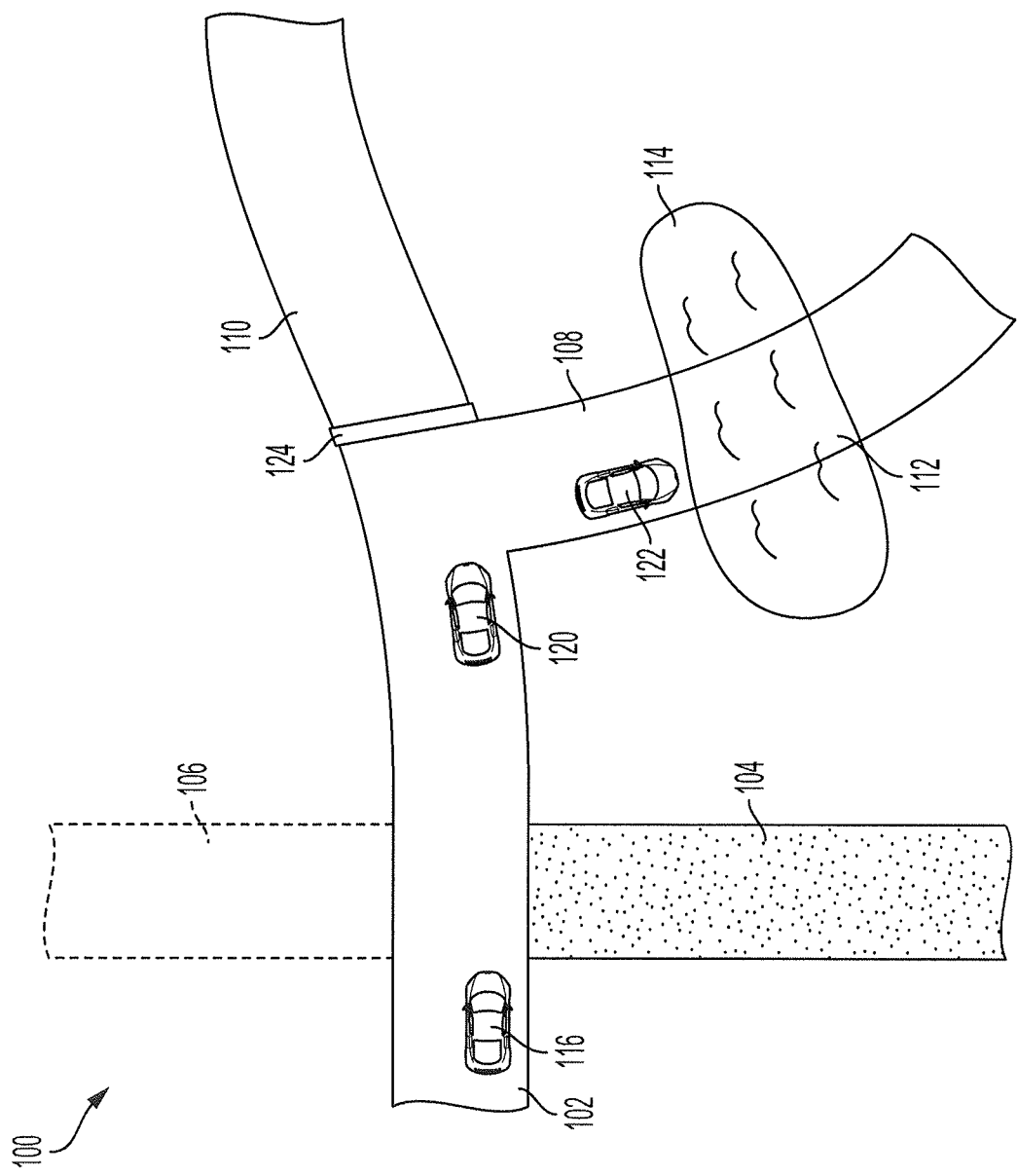
FIG. 1 illustrates vehicles travelling over various roads, according to various embodiments of the invention.

FIG. 1 illustrates an area 100 of various roads and vehicles travelling thereon. There is a first road 102, a second road 104, a third road 106, a fourth road 108, and a fifth road 110. These roads may also be referred to as road segments, or portions of a longer road.

A map provided by a navigation unit of a vehicle may indicate that all of the roads (the first road 102, the second road 104, the third road 106, the fourth road 108, and the fifth road 110) are capable of being driven on, and the navigation unit of the vehicle may use these roads to navigate the driver to a destination. However, not all of these roads may be capable of being driven on in reality.

The second road 104 may be an unpaved road (e.g., a dirt road, a grass road, or any other road that has not been covered in asphalt or other paving compound) that only off-road vehicles can traverse. The third road 106 may have previously been a road, but has since been closed and used for another purpose other than being driven on by vehicles. The fourth road 108 may be an otherwise drivable road, but is currently not drivable due to a pile of snow 114 located at a location 112 along the fourth road 108. The fifth road 110 may not be publicly accessible because of a gate 124 (or other barrier that requires authorization to overcome). As used herein, the state of the road may refer to one or more conditions associated with the road, such as drivable, paved, unpaved, closed, blocked, public, or private, for example. In some embodiments, the state of the road may also refer to whether one or more maneuvers are possible at a particular location on the road.

Sensors on the vehicles 116, 120, 122, may be used to determine whether the roads 102-110 are capable of being driven on. The vehicles (e.g., first vehicle 116, second vehicle 120, and third vehicle 122) may include various sensors, such as location sensors, image sensors, and spatial detection sensors that may be used to detect whether the roads are capable of being driven on. Some sensors, such as image sensors and spatial detection sensors, may be located on an external surface of the vehicle or within the vehicle but proximal to an outward-facing opening, and some sensors, such as location sensors, may be located within the vehicle.

The first vehicle 116 may use an image sensor to detect image data associated with the road around the first vehicle 116. The image data may indicate that the second road 104 is a dirt road that has uneven terrain not suitable for conventional vehicles. The image data may also indicate that the third road 106 is no longer present, and has been replaced with a building or other structure.

The second vehicle 120 may use an image sensor or a spatial detection sensor to detect image data or spatial data, respectively. The image data or spatial data may indicate the presence of a barrier 124 preventing the second vehicle 120 from traversing the fifth road 110. The image data or spatial data may also indicate a distance to the barrier 124 from the second vehicle 120. The image data or spatial data may also indicate what material the barrier 124 is made of and/or any signs or words associated with the barrier 124.

The third vehicle 122 may use an image sensor or a spatial detection sensor to detect image data or spatial data, respectively. The image data or spatial data may indicate the presence of an object (e.g., snow 114) at a location 112 on the fourth road 108, which make traversing the fourth road 108 not possible. The image data or spatial data may indicate characteristics of the object, such as object height, object width, materials the object may be made of, and/or distance to the object.

The various detected roads and/or the various detected road impediments may be categorized into various categories and used to update the map data associated with the area 100. For example, the second road 104 may be categorized as capable of being traversed by some vehicles, but may not be suitable for vehicles which may be damaged by the uneven, rocky, or dusty conditions on the unpaved road. Accordingly, the second road 104 may remain in the map data, but additional warnings or conditions of travel may be associated with the second road 104 and vehicles attempting to traverse the second road 104 may be provided with a warning.

The third road 106 may be categorized as a permanent road change or closure, and the third road 106 may be removed from the map data. The fourth road 108 may be categorized as having a temporary impediment, and may have a warning associated with it. The warning may be provided to vehicles attempting to traverse the fourth road 108, and may include an identification of the impediment (e.g., "a pile of snow"). The fifth road 110 may be categorized as having a permanent barrier or the fifth road 110 may also be categorized as being a private road.

The vehicles 116, 120, 122 may use machine learning techniques to automatically identify impediments and road conditions based on the detected data from the vehicle sensors. The machine learning techniques may use training data and feedback responses to train one or more computer processing devices to identify and classify impediments or road conditions.

The location data of the vehicles may also be used to determine that a road is not drivable. If the location data indicates that many vehicles do not traverse a road despite being prompted to by the navigation unit, and these vehicles seek alternate routes, it may be determined that the roads are not drivable. For example, if the second vehicle 120 is instructed to traverse the fifth road 110, but the location data detected by the location sensor indicates that the second vehicle 120 approached the fifth road 110, stopped, and turned around to drive around the fifth road 110, it may be determined that there was an impediment to traversing the fifth road 110. The fifth road 110 may be removed from possible roads used by the navigation unit on a temporary or permanent basis. In some embodiments, the fifth road 110 may be removed when a threshold number of vehicles or a threshold percentage of vehicles do not traverse the fifth road 110 despite being instructed to by the navigation unit. In addition to or in lieu of determining whether a threshold number of vehicles or a threshold percentage of vehicles do not traverse a particular road, the vehicle sensor data may be analyzed to determine whether the state of the road determined based on the location data may be corroborated using vehicle sensor data. For example, image data may be used to verify the state of a road that is initially determined using location data.

The map data that is updated using the sensor data from the vehicles 116, 120, 122 may be utilized by other vehicles that are planning routes that may involve traversing the roads 102-110. Subsequent vehicles that traverse the roads 102-110 may detect their own sensor data and the conditions of the roads 102-110 may be updated. In this way, the maps associated with the roads 102-110 are updated on a continuous basis. For example, when the pile of snow 114 eventually melts, the fourth road 108 will eventually become drivable again, and when a vehicle identifies that the fourth road 108 is drivable, the map data will be updated so that other vehicles will be aware that the fourth road 108 is drivable.

In some embodiments, a temporary impediment may have an associated expiration date and time. The image data may include a sign or other indication of an anticipated expiration date and time of the temporary impediment. For example, a road may be closed for construction, and a barrier may include a sign that identifies when the barrier will be removed. In another example, anticipated weather conditions may be used to determine an estimated time when the pile of snow 114 will melt and render the fourth road 108 drivable again.

Figure 2:
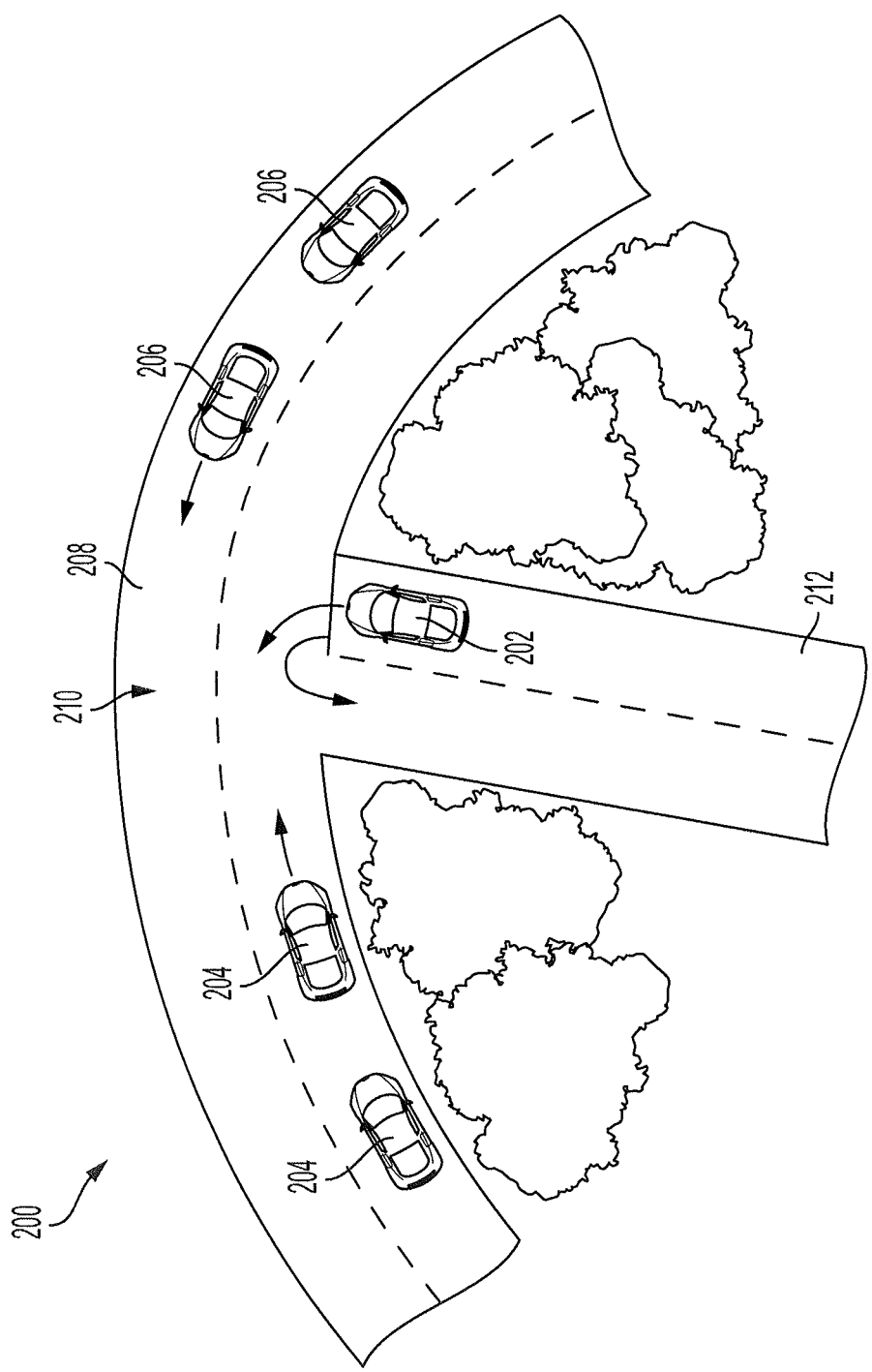
FIG. 2 illustrates a vehicle in a situation where executing a turn is difficult, according to various embodiments of the invention.

FIG. 2 illustrates an area 200 where a vehicle may be legally and physically able to make a turn, but in reality, the turn is very difficult, and the map data used by a navigation unit may exclude the maneuver from the list of possible maneuvers.

The vehicle 202 may be prompted by its navigation unit to make a left turn or a U-turn at the intersection 210. However, in reality, there may be cross-traffic of first-direction vehicles 204 on the road 208 approaching from a first direction, and there may also be cross-traffic of second-direction vehicles 206 on the road 208 approaching from a second direction. These first-direction vehicles 204 and these second-direction vehicles 206 may be consistently travelling at speeds sufficiently high (e.g., greater than 50 miles per hour) that it is difficult for the vehicle 202 to make a left turn or a U-turn at the intersection 210.

The speeds of the first-direction vehicles 204 and the second-direction vehicles 206 may be determined by sensors of the vehicle 202, such as image sensors, or spatial detection sensors (e.g., RADAR or LIDAR), for example. The speeds of the first-direction vehicles 204 and the second-direction vehicles 206 may also be determined by a remote data server receiving location data from one or more of the vehicles of the first-direction vehicles 204 and the second-direction vehicles 206. For example, a remote data server may receive, via respective transceivers (e.g., using over-the-air communication), location data and/or vehicle speed data from one or more vehicles of the first-direction vehicles 204 and the second-direction vehicles 206. In some embodiments, the vehicle 202 receives the location data and/or vehicle speed data from the one or more vehicles of the first-direction vehicles 204 and the second-direction vehicles 206.

Alternatively, or in addition, the location data of the vehicle 202 detected by a location sensor of the vehicle 202 may indicate that the vehicle 202 has been at the intersection 210 for a long time (e.g., over 5 minutes or another configurable time threshold) and the vehicle 202 has not yet turned. In addition, the location data may also indicate that the vehicle 202 ultimately turns around and travels back on the road 212 from which it came. In some embodiments, the maneuver of turning at the intersection 210 may be removed as a possible maneuver by the navigation unit when a threshold number of vehicles or a threshold percentage of vehicles do not perform the maneuver despite being instructed to by the navigation unit to do so.

By removing these maneuvers from the possible suggested maneuvers for the driver to make, driving efficiency may be improved, as drivers may not remain at an intersection for an unnecessarily long period of time, and driving safety may be improved, as drivers may not perform potentially dangerous maneuvers.

Figure 3:
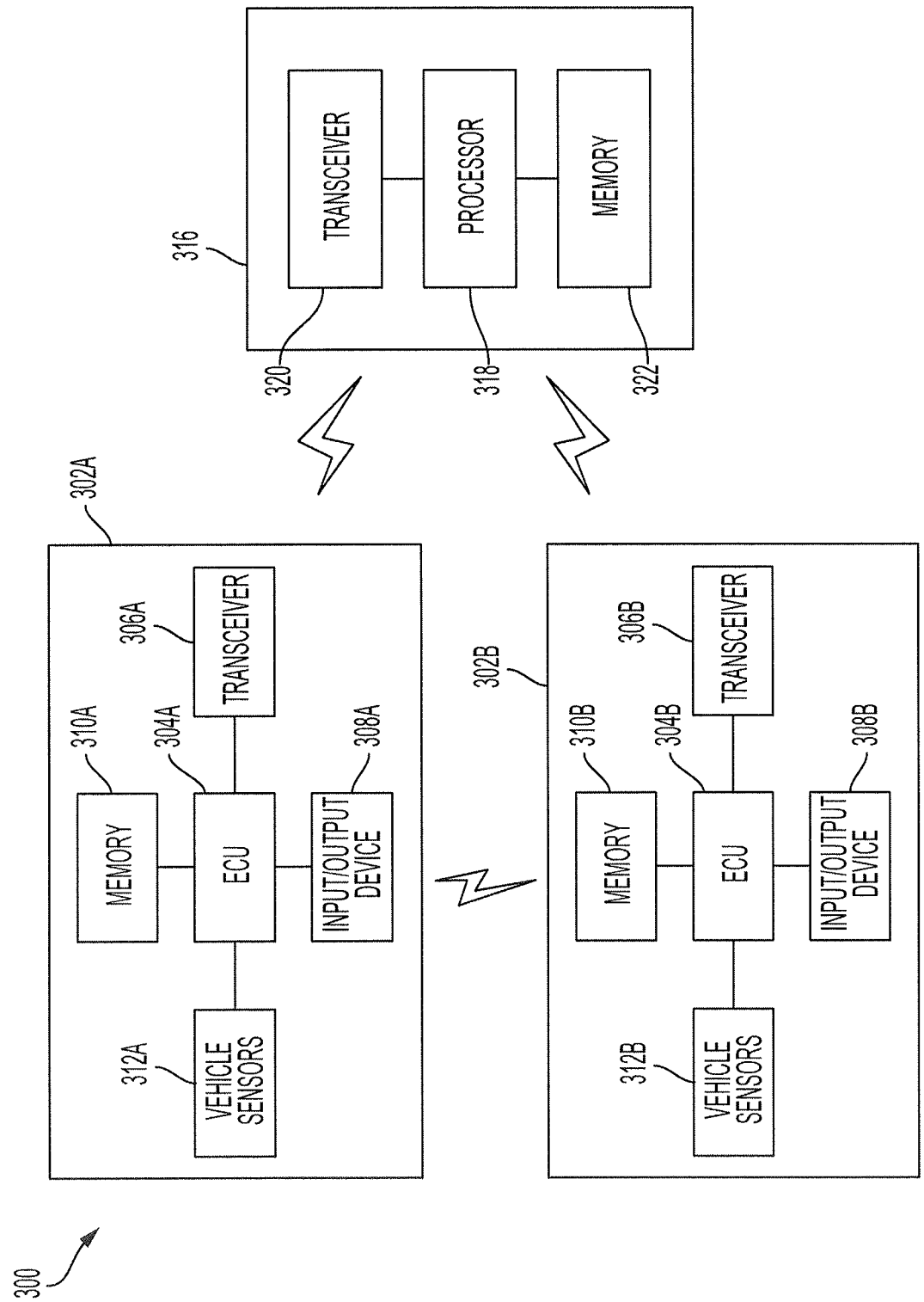
FIG. 3 illustrates a block diagram of the system, according to various embodiments of the invention.

FIG. 3 illustrates a system 300. The system 300 includes a first vehicle 302A, a second vehicle 302B, and a remote data server 316. Components having a letter suffix may be referred to collectively or individually by the number before the letter suffix. For example, vehicle 302 may refer to the first vehicle 302A and the second vehicle 302B collectively or may refer to either the first vehicle 302A or the second vehicle 302B individually. The vehicles 302 may be similar to any of the vehicles described herein, such as vehicles 116, 120, 122 or vehicle 202.

The vehicle 302 may have an automatic or manual transmission. The vehicle 302 is a conveyance capable of transporting a person, an object, or a permanently or temporarily affixed apparatus. The vehicle 302 may be a self-propelled wheeled conveyance, such as a car, sports utility vehicle, truck, bus, van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation.

The vehicle 302 may be capable of non-autonomous operation or semi-autonomous operation or autonomous operation. That is, the vehicle 302 may be driven by a human driver or may be capable of self-maneuvering and navigating without human input. A vehicle operating semi-autonomously or autonomously may use one or more sensors and/or a navigation unit to drive autonomously.

The vehicle 302 includes an ECU 304 (e.g., ECU 304A and 304B) connected to a transceiver 306 (e.g., 306A and 306B), input/output device 308 (e.g., 308A and 308B), a memory 310 (e.g., 310A and 310B), and vehicle sensors 312 (e.g., 312A and 312B). The ECU 304 may be one or more ECUs, appropriately programmed, to control one or more operations of the vehicle. The one or more ECUs 304 may be implemented as a single ECU or in multiple ECUs. The ECU 304 may be electrically coupled to some or all of the components of the vehicle. In some embodiments, the ECU 304 is a central ECU configured to control one or more operations of the entire vehicle. In some embodiments, the ECU 304 is multiple ECUs located within the vehicle and each configured to control one or more local operations of the vehicle. In some embodiments, the ECU 304 is one or more computer processors or controllers configured to execute instructions stored in a non-transitory memory 310. All of the elements of the vehicle 302 may be connected via a communications bus.

As used herein, a navigation unit may be a combination of the input/output device 308 operating in conjunction with the ECU 304, a location sensor of the vehicle sensors 312, and map data stored in memory 310 to detect a location of the vehicle, determine a route to a destination, and display the route to the destination for the driver.

The vehicle 302 may also have an infotainment unit, which has an input/output device 308 (e.g., a touchscreen display). The input/output device 308 may also display a map with turn-by-turn navigation directions to a destination.

As described herein, the vehicle sensors 312 are configured to detect sensor data associated with the vehicle and the surroundings of the vehicle, such as location data, image data, and/or spatial detection data. The vehicle sensors 312 may include a location sensor configured to detect location data of the vehicle, an image sensor (e.g., a camera) configured to detect image data of the surroundings of the vehicle, and/or a spatial detection sensor configured to detect spatial data of the surroundings of the vehicle.

The ECU 304 may use the location data along with map data stored in memory 310 to determine a location of the vehicle. In other embodiments, the location sensor has access to the map data and may determine the location of the vehicle and provide the location of the vehicle to the ECU 304. The location sensor may include a GPS unit, a GLONASS system device, a Galileo system device, or any other global location detection device.

The memory 310 is connected to the ECU 304 and may be connected to any other component of the vehicle. The memory 310 is configured to store any data described herein, such as the vehicle sensor data, the map data, data received from any other sensors, and any data received from the remote data server 316 via the transceiver 306.

The vehicle 302 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 302 to a remote data server 316.

The transceiver 306 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 306 may transmit data to and receive data from devices and systems not physically connected to the vehicle. For example, the ECU 304 may communicate with the remote data server 316. Furthermore, the transceiver 306 may access the network, to which the remote data server 316 is also connected.

In some embodiments, the ECU 304 determines whether a road is not drivable based on the sensor data and/or whether a particular maneuver at a particular location is not possible based on the sensor data. In other embodiments, the processor 318 of a remote data server 316 determines whether a road is not drivable based on the sensor data received from one or more vehicles 302 and/or whether a particular maneuver at a particular location is not possible based on the sensor data received from one or more vehicles 302. As used herein, a maneuver that is determined to not be possible by the ECU 304 or the processor 318 may be physically and legally possible, but not realistically possible due to one or more factors (e.g., speed of cross-traffic, obstructed view of cross-traffic).

The sensor data may be communicated from the vehicle 302 to the remote data server 316 via the transceiver 306 of the vehicle 302 and the transceiver 320 of the remote data server 316. The remote data server 316 includes a processor 318, a transceiver 320, and a memory 322, all connected to each other via a communications bus. The processor 318 (and any processors described herein) may be one or more computer processors configured to execute instructions stored on a non-transitory memory.

The memory 322 may be a non-transitory memory configured to store sensor data of a plurality of vehicles 302 and map data to be used by navigation units of those vehicles 302. The map data may include road data indicating various attributes of a road, such as whether the road is drivable, whether there is a road closure, and whether a road closure is permanent or temporary. The map data may also include maneuvering data at various intersections and road locations indicating what types of vehicle maneuvers are possible. The stored sensor data may be indexed by a road identifier associated with a particular road, and the road identifier may be associated with sensor data when the sensor data is communicated from the vehicle 302 to the remote data server 316. The stored sensor data may also be indexed by a location identifier associated with a particular road location or intersection, and the location identifier may be associated with sensor data when the sensor data is communicated from the vehicle 302 to the remote data server 316. The memory 322 may sort the data in any way that increases the processor's ability to efficiently access the data. The transceiver 320 may be configured to transmit and receive data, similar to transceiver 306.

Once the map data has been determined or updated, the map data may be used by one or more vehicles to navigate their respective drivers to a destination. For example, a first vehicle 302A may detect sensor data and communicate the sensor data to the remote data server 316. The processor 318 of the remote data server 316 may determine that one or more roads are closed or one or more maneuvers are not possible at a given intersection, and the map data may be updated. The remote data server 316 may communicate the updated map data to the first vehicle 302A and the second vehicle 302B.

While only two vehicles 302A-302B are shown, any number of vehicles may be used. Likewise, while only one remote data server 316 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple vehicles or sensors may be used to increase the robustness of sensor data. Multiple remote data servers may be interconnected using any type of network, or the Internet.

As used herein, a "unit" may refer to hardware components, such as one or more computer processors, controllers, or computing devices configured to execute instructions stored in a non-transitory memory.

Figure 4:
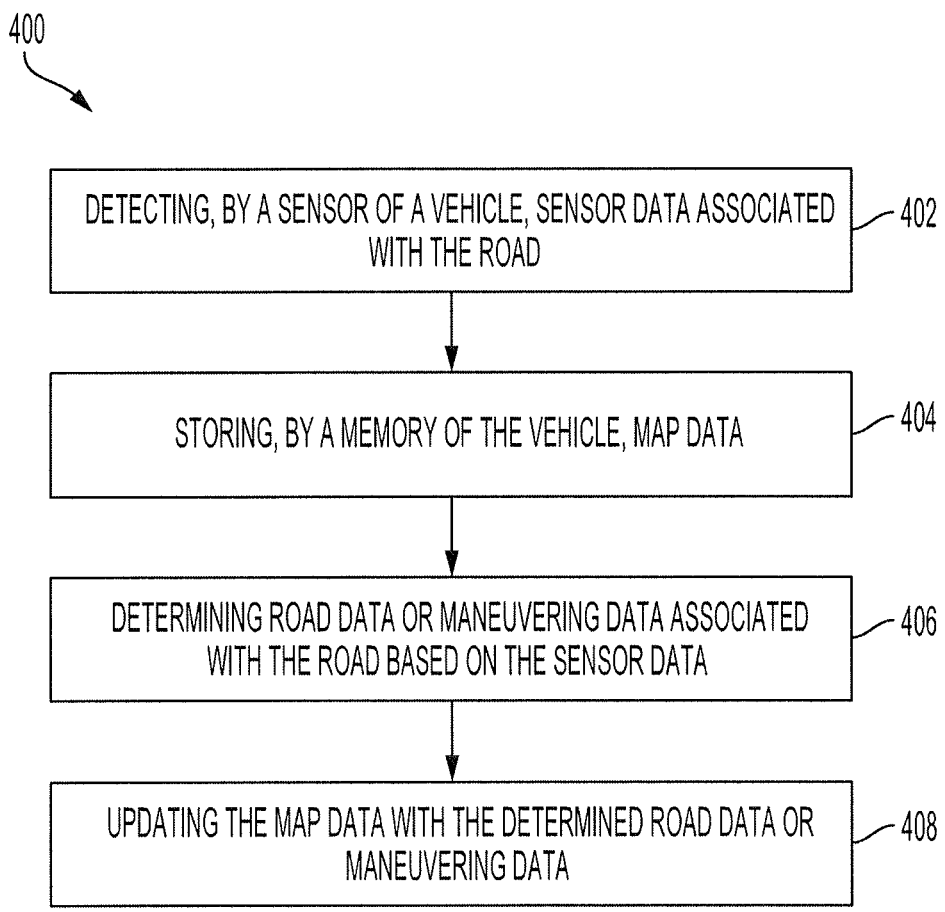
FIG. 4 illustrates a process of the system, according to various embodiments of the invention.

FIG. 4 illustrates a process 400 performed by the system described herein.

A sensor (e.g., vehicle sensor 312) of a vehicle (e.g., vehicle 302) detects sensor data associated with a road (step 402). The sensor may be at least one of a location sensor, an image sensor, or a spatial detection sensor. The location sensor is configured to detect location data associated with the vehicle. The image sensor is configured to detect image data associated with an environment of the vehicle, including image data associated with the road. The spatial detection sensor (e.g., RADAR or LIDAR) is configured to detect spatial data associated with an environment of the vehicle, including spatial data associated with the road.

The sensor data may be stored in a memory (e.g., memory 310) of the vehicle. The sensor data may be associated with a road identifier associated with the road, and the sensor data may be indexed in the memory based on the road identifier.

The memory of the vehicle also stores map data (step 404). The map data may include road data and maneuvering data associated with each road and locations within each road. The road data may indicate one or more characteristics associated with each respective road, such as location, road identifier, or a state of the road (e.g., drivable, not drivable, paved, unpaved, closed, blocked, public, or private). The maneuvering data may indicate one or more maneuvers that are possible or not possible at particular location on the road. For example, at a particular intersection between Road A and Road B, vehicles on Road B are able to make right turns but are unable to make left turns or U-turns. The map data may be used by an ECU (e.g., ECU 304) of the vehicle to determine navigation directions from a current location to a destination.

Road data or maneuvering data associated with the road may be determined based on the sensor data (step 406). The ECU of the vehicle may determine the road data or maneuvering data associated with the road based on the sensor data, or a processor (e.g., processor 318) of a remote data server (e.g., remote data server 316) may determine the road data or maneuvering data associated with the road based on the sensor data. When the processor of the remote data server determines the road data or maneuvering data associated with the road based on the sensor data, the remote data server may receive the sensor data from the vehicle via respective transceivers. That is, a transceiver (e.g., transceiver 306) of the vehicle may communicate the sensor data to a transceiver (e.g., transceiver 320) of the remote data server.

The ECU or the processor may determine the road data or maneuvering data by analyzing the sensor data to identify objects or trends associated with a closed, blocked, or undrivable road or a maneuver that is not possible. A closed road may be identified from image data or spatial data when the geographic location associated with the road is not identified as being a road, but rather another object, such as a building. This identification may be performed using machine learning techniques by training the ECU or the processor using training data of roads and other objects. The analysis of the image data or spatial data may also identify whether the road closure is permanent or temporary. For example, if a sign explaining the closure of the road is present, the sign may be analyzed to determine whether the road closure is permanent or temporary.

A blocked road may be identified from image data or spatial data when a barrier or other obstruction is identified from the image data or spatial data. Again, this identification may be performed using machine learning techniques by training the ECU or the processor using training data of roads and other objects. A blocked road may also be verified using location data of the vehicle. If the location data indicates that the vehicle approached the road, but turned around instead of passing through, the road may be determined to be blocked. The analysis of the image data or spatial data may also identify whether the road blockage is permanent or temporary. For example, if the blockage is identified as being a pile of snow, the ECU or processor may determine that the blockage is temporary. However, if the blockage is identified as being a gate, the ECU or processor may determine that the blockage is permanent.

An undrivable road may be identified from image data or spatial data when characteristics of an undrivable road are present. For example, when uneven terrain (e.g., grassy terrain or sandy terrain) is identified, the ECU or processor may determine that the road has uneven terrain and may therefore be undrivable. This identification may be performed using machine learning techniques by training the ECU or the processor using training data of types of roads.

Identifying a maneuver that is not possible may be based on a combination of location data and image data and/or spatial data. As discussed herein with respect to FIG. 2, the location data of a first vehicle and the location data of a plurality of other vehicles that form cross-traffic may be used to determine whether the first vehicle may be able to make a particular maneuver (e.g., left turn or U-turn) on the road. The image data or spatial data may be used to identify a speed of the cross-traffic or other objects (e.g., trees or buildings) that prevent the vehicle from making the maneuver.

The map data is then updated using the determined road data or maneuvering data (step 408). The determined road data or maneuvering data may be associated with a road identifier, and the road characteristics associated with the road identifier may be updated in the map data based on the determined road data or maneuvering data. For example, the map data may initially indicate that Road 89DFJ87 is a paved road, but the determined road data may indicate that Road 89DFJ87 is blocked due to a pile of snow. The map data may be updated to indicate that Road 89DFJ87 is blocked. When an ECU of a vehicle attempts to navigate a driver to a destination, Road 89DFJ87 will no longer be considered, as it is blocked.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for a vehicle for verifying a state of a road, the system comprising:
   a sensor configured to detect sensor data associated with the road;
   a transceiver configured to communicate with a remote data server;
   a memory configured to store map data; and
   an electronic control unit (ECU) connected to the sensor, the transceiver, and the memory and configured to:
   receive, by the transceiver and from the remote data server, (i) road data relating to one or more conditions associated with the road, the one or more conditions categorized by an expected duration of impediment, and (ii) maneuvering data relating to the road and a plurality of vehicles,
   determine that a percentage of the plurality of vehicles avoided the road in spite of a navigational instruction to traverse the road based on the received maneuvering data,
   update the map data based on the expected duration of impediment due to at least one of the one or more conditions included in the received road data and the percentage of the plurality of vehicles which avoided the road in spite of the navigational instruction to traverse the road, and
   control the vehicle to avoid the road based on the sensor data and the updated map data.

2. The system of claim 1, wherein the ECU is further configured to determine a series of navigation directions for a driver of the vehicle to execute, the series of navigation directions determined based on the updated map data.

3. The system of claim 2, further comprising an input/output device configured to:
   receive an input related to a destination to navigate to, and
   display the series of navigation directions for the driver of the vehicle to execute.

4. The system of claim 2, wherein the ECU is further configured to exclude a direction to traverse the road from the series of navigation directions based on the sensor data indicating that the road is closed or blocked.

5. The system of claim 2, wherein the ECU is further configured to exclude maneuvers that are determined to be not possible from the series of navigation directions.

6. The system of claim 1, wherein the sensor includes at least one of a location sensor, an image sensor, or a spatial detection sensor.

7. The system of claim 1, wherein the ECU is further configured to, by the transceiver, communicate the updated map data to the remote data server.

8. The system of claim 7, wherein the updated map data is configured for use by one or more other vehicles including a second vehicle, the second vehicle including:
   a second transceiver configured to receive the updated map data from the remote data server; and
   a second ECU configured to determine a series of navigation directions for a driver of the second vehicle to execute, the series of navigation directions determined based on the updated map data.

9. A system for verifying a state of a road, the system comprising:
   a sensor located in a vehicle and configured to detect sensor data associated with the road;
   a transceiver located in the vehicle and configured to communicate the sensor data to a remote data server;
   a memory located in the remote data server and configured to store map data;
   a processor located in the remote data server and configured to:
   receive a plurality of respective sensor data associated with the road from a plurality of vehicles, determine (i) road data relating to one or more conditions associated with the road, the one or more conditions categorized by an expected duration of impediment, and (ii) respective maneuvering data relating to the road and the plurality of vehicles based on the plurality of respective sensor data associated with the road from the plurality of vehicles, determine that a percentage of the plurality of vehicles avoided the road in spite of a navigational instruction to traverse the road based on the respective maneuvering data, and update the map data based on the expected duration of impediment due to at least one of the one or more conditions included in the road data and the percentage of the plurality of vehicles which avoided the road in spite of the navigational instruction to traverse the road;

a transceiver located in the remote data server and configured to communicate the updated map data to the vehicle; and an electronic control unit (ECU) located in the vehicle, coupled to the sensor located in the vehicle and the transceiver located in the vehicle, and configured to:
receive, by the transceiver located in the vehicle, the updated map data from the remote data server, and
control the vehicle to avoid the road based on the sensor data detected by the sensor located in the vehicle and the received updated map data.

10. The system of claim 9, wherein the ECU located in the vehicle is further configured to determine a series of navigation directions for a driver of the vehicle to execute, the series of navigation directions determined based on the updated map data.

11. The system of claim 10, further comprising an input/output device located in the vehicle and configured to:
receive an input related to a destination to navigate to, and
display the series of navigation directions for the driver of the vehicle to execute.

12. The system of claim 10, wherein the ECU located in the vehicle is further configured to exclude a direction to traverse the road from the series of navigation directions based on the sensor data detected by the sensor located in the vehicle indicating that the road is closed or blocked.

13. The system of claim 10, wherein the ECU located in the vehicle is further configured to exclude maneuvers that are determined to be not possible from the series of navigation directions.

14. The system of claim 9, wherein the sensor located in the vehicle includes at least one of a location sensor, an image sensor, or a spatial detection sensor.

15. A method for a vehicle for verifying a state of a road, the method comprising:
detecting, by a sensor, sensor data associated with the road;
storing, by a memory, map data;
receiving, by a transceiver and from a remote data server, (i) road data relating to one or more conditions associated with the road, the one or more conditions categorized by an expected duration of impediment, and (ii) maneuvering data relating to the road and a plurality of vehicles;
determining, by an electronic control unit (ECU) coupled to the sensor, the memory, and the transceiver, that a percentage of the plurality of vehicles avoided the road in spite of a navigational instruction to traverse the road based on the received maneuvering data;
updating, by the ECU, the map data based on the expected duration of impediment due to at least one of the one or more conditions included in the received road data and the percentage of the plurality of vehicles which avoided the road in spite of the navigational instruction to traverse the road; and
controlling, by the ECU, the vehicle to avoid the road based on the sensor data and the updated map data.

16. The method of claim 15, further comprising:
determining, by the ECU, second maneuvering data associated with the road and the vehicle based on the sensor data.

17. The method of claim 15, further comprising communicating, by the transceiver, the updated map data to the remote data server.

18. The method of claim 15, further comprising communicating, by the transceiver, the sensor data to the remote data server.

19. The method of claim 15, further comprising determining, by the ECU, a series of navigation directions for a driver of the vehicle to execute, the series of navigation directions determined based on the updated map data.

20. The method of claim 19, further comprising:
receiving, by an input/output device coupled to the ECU, an input related to a destination to navigate to; and
displaying, by the input/output device, the series of navigation directions for the driver of the vehicle to execute.

* * * * *